(12) United States Patent
Williams

(10) Patent No.: US 12,515,567 B2
(45) Date of Patent: Jan. 6, 2026

(54) ROTATABLE SAFETY SEAT AND METHOD OF ROTATION THEREOF

(71) Applicant: Wonderland Switzerland AG, Steinahusen (CH)

(72) Inventor: Bruce L. Williams, Narvon, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/613,983

(22) Filed: Mar. 22, 2024

(65) Prior Publication Data
US 2024/0227637 A1    Jul. 11, 2024

Related U.S. Application Data

(63) Continuation of application No. 18/154,518, filed on Jan. 13, 2023, now Pat. No. 12,139,055, which is a
(Continued)

(51) Int. Cl.
*B60N 2/28*    (2006.01)
*B60N 2/90*    (2018.01)

(52) U.S. Cl.
CPC .......... *B60N 2/2869* (2013.01); *B60N 2/919* (2018.02); *B60N 2/2821* (2013.01); *B60N 2002/952* (2018.02)

(58) Field of Classification Search
None
See application file for complete search history.

(56) References Cited

U.S. PATENT DOCUMENTS

| | | | |
|---|---|---|---|
| 5,022,669 A * | 6/1991 | Johnson | B60N 2/286 |
| | | | 280/47.38 |
| 5,033,669 A | 7/1991 | Federico | |

(Continued)

FOREIGN PATENT DOCUMENTS

| | | |
|---|---|---|
| CN | 1388784 A | 1/2003 |
| CN | 201124777 Y | 10/2008 |

(Continued)

OTHER PUBLICATIONS

International Search Report issued to PCT Application No. PCT/EP2020/084493 dated Mar. 11, 2021.
(Continued)

*Primary Examiner* — Anthony D Barfield
(74) *Attorney, Agent, or Firm* — Volpe Koenig

(57) ABSTRACT

A safety seat and method for rotating a safety seat to multiple positions. The safety seat includes a first base having a first opening and a second opening, a second base rotatable relative to the first base about an axis, a seat rotatable relative to the first base about the axis between a forward-facing position and a rear-facing position, and a lock disposed on the second base. The lock has a first movable lock component to lock the first base with the second base, and a first resilient member to abut the first movable lock component and bias the first movable lock component to be received by the first opening or the second opening. The seat is in the forward-facing position when the first movable lock component is received by the first opening and in the rear-facing position when the first movable lock component is received by the second opening.

35 Claims, 5 Drawing Sheets

Related U.S. Application Data continuation of application No. 16/991,764, filed on Aug. 12, 2020, now Pat. No. 11,565,612.

(60) Provisional application No. 62/947,239, filed on Dec. 12, 2019.

(56) References Cited

U.S. PATENT DOCUMENTS

| | | | |
|---|---|---|---|
| 6,139,101 A * | 10/2000 | Berringer | B60N 2/2821 297/256.16 |
| 6,260,920 B1 | 7/2001 | Tofsen | |
| 6,367,875 B1 | 4/2002 | Bapst | |
| 7,073,859 B1 | 7/2006 | Wilson | |
| 7,338,122 B2 | 3/2008 | Hei et al. | |
| 7,357,451 B2 | 4/2008 | Bendure et al. | |
| 7,481,492 B2 | 1/2009 | Lhomme et al. | |
| 8,651,572 B2 | 2/2014 | Medeiros et al. | |
| 8,955,915 B2 * | 2/2015 | Mason | B60N 2/2812 297/250.1 |
| 9,090,182 B2 | 7/2015 | Rabeony | |
| 9,873,359 B2 | 1/2018 | Williams | |
| 10,322,651 B2 | 6/2019 | Hutchinson et al. | |
| 10,457,168 B2 | 10/2019 | Anderson et al. | |
| 10,688,892 B2 | 6/2020 | Anderson et al. | |
| 2002/0145319 A1 | 10/2002 | Tsugimatsu et al. | |
| 2002/0163232 A1 | 11/2002 | Vezinet et al. | |
| 2002/0195849 A1 * | 12/2002 | Bedard | B60N 2/2845 297/250.1 |
| 2005/0151402 A1 * | 7/2005 | Balensiefer | B60N 2/2875 297/250.1 |
| 2005/0253431 A1 | 11/2005 | Hei et al. | |
| 2005/0264064 A1 | 12/2005 | Hei et al. | |
| 2007/0046087 A1 * | 3/2007 | Nakagawa | B60N 2/2884 297/256.13 |
| 2008/0224516 A1 | 9/2008 | Vegt | |
| 2009/0091167 A1 | 4/2009 | Jha et al. | |
| 2011/0109137 A1 | 5/2011 | Tamanouchi et al. | |
| 2011/0109138 A1 | 5/2011 | Inoue et al. | |
| 2012/0326474 A1 * | 12/2012 | Williams | B60N 2/2356 280/30 |
| 2014/0084650 A1 | 3/2014 | Rabeony | |
| 2016/0176320 A1 * | 6/2016 | Williams | B60N 2/2821 297/256.13 |
| 2018/0264977 A1 | 9/2018 | Anderson et al. | |
| 2021/0178938 A1 | 6/2021 | Williams | |
| 2021/0237626 A1 * | 8/2021 | Longenecker | B60N 2/2806 |
| 2022/0355713 A1 * | 11/2022 | Longenecker | B60R 1/008 |
| 2023/0014310 A1 * | 1/2023 | Longenecker | B60N 2/2806 |
| 2023/0256875 A1 | 8/2023 | Zhang | |
| 2024/0149767 A1 * | 5/2024 | Lee | B60N 2/938 |

FOREIGN PATENT DOCUMENTS

| | | |
|---|---|---|
| CN | 101734178 A | 6/2010 |
| CN | 104859493 A | 8/2015 |
| CN | 204623214 U | 9/2015 |
| CN | 105172623 A | 12/2015 |
| CN | 107512204 A | 12/2017 |
| CN | 108349412 A | 7/2018 |
| CN | 110466399 A | 11/2019 |
| DE | 69719540 T2 | 12/2003 |
| EP | 2701944 B1 | 7/2015 |
| GB | 1184181 A * | 3/1970 |
| GB | 2207043 A | 1/1989 |
| TW | 338022 B | 8/1998 |
| TW | M267103 U | 6/2005 |
| TW | 1775222 B | 8/2022 |
| WO | 0208013 A1 | 1/2002 |

OTHER PUBLICATIONS

First Chinese Office Action and Search Report; Chinese Application No. 2020108299888; Date: Aug. 24, 2022; 18 pages with translation.

Taiwan Office Action; Taiwan Application No. 111128298; Date: Nov. 8, 2022; 13 pages with translation.

Office Action issued in corresponding Taiwanese Application No. 112147296 dated Mar. 14, 2024. English Machine Translation Included.

"International Search Report for PCT Patent Application No. PCT/EP2020/084493", Mailed Date: Mar. 11, 2021, 10 pages.

"Final Office Action for U.S. Appl. No. 16/991,764", Mailed Date: May 27, 2022, 15 pages.

"Final Office Action for U.S. Appl. No. 18/154,518", Mailed Date: Oct. 23, 2023, 14 pages.

"Final Office Action for U.S. Appl. No. 18/154,518", Mailed Date: Jun. 6, 2024, 20 pages.

"Non-Final Office Action for U.S. Appl. No. 16/991,764", Mailed Date: Feb. 17, 2022, 13 pages.

"Non-Final Office Action for U.S. Appl. No. 18/154,518", Mailed Date: Apr. 26, 2023, 13 pages.

"Non-Final Office Action for U.S. Appl. No. 18/154,518", Mailed Date: Feb. 16, 2024, 17 pages.

"Notice of Allowance and Fees Due for U.S. Appl. No. 16/991,764", Mailed Date: Sep. 28, 2022, 10 pages.

Non-Final Office Action for corresponding U.S. Appl. No. 18/431,027 dated Sep. 24, 2024, 30 pages long.

Applicant Initiated Interview Summary for corresponding U.S. Appl. No. 18/654,636 dated Jan. 6, 2025, 3 pages long.

* cited by examiner

ROTATABLE SAFETY SEAT AND METHOD OF ROTATION THEREOF

CROSS-REFERENCE TO RELATED APPLICATIONS

This application is a Continuation of U.S. Non-Provisional application Ser. No. 18/154,518, filed on Jan. 13, 2023, now U.S. Pat. No. 12,139,055, which is a Continuation of U.S. Non-Provisional application Ser. No. 16/991,764, filed Aug. 12, 2020, now U.S. Pat. No. 11,565,612, issued on Jan. 31, 2023, which claims the benefit of U.S. Provisional Application No. 62/947,239, filed Dec. 12, 2019, the disclosures of which are incorporated herein by reference in their entirety.

FIELD

The disclosure relates to a child safety seat, and more particularly, to a child restraint spin lock for use with a safety seat of a vehicle.

BACKGROUND

Many conventional child restraint systems in the market come with child's seats that are rotatable while being installed in a vehicle for enhanced functionality. Such conventional child restraint systems usually include spin lock mechanisms to position the seats in a rear facing position or a forward facing position. However, the spin lock mechanisms used in the conventional child restraint systems have been found to be overly complex and may lack adequate spin lock retention in the event of a vehicle crash.

SUMMARY

Therefore, the object of the disclosure is to provide a child restraint spin lock and a safety seat having the same that allow for ease of use, and that provide improved retention in the event of a vehicle crash.

According to one aspect of the disclosure, a child restraint spin lock is adapted to be installed in a safety seat of a vehicle. The safety seat includes a base member that has two lock sections being spaced apart from each other, and a mid base that is mounted to the base member and that is rotatable relative to the base member about an axis.

The child restraint spin lock includes two locking components and a pivot component.

The locking components are adapted to be co-rotatably connected to the mid base, and are spaced apart from each other. Each of the locking components has a first end portion and a second end portion that are respectively proximate to and distal from the axis. Each of the locking components is adapted to be movable relative to the base member between a locked position, where the second end portion of each of the locking components is adapted to be engaged with a respective one of the lock sections of the base member such that the mid base is not allowed to rotate relative to the base member, and an unlocked position, where the second end portion of each of the locking components is adapted to be disengaged from the respective one of the lock sections of the base member.

The pivot component is adapted to be connected to the mid base, is rotatable relative to the mid base about the axis, and has two end segments. Each of the end segments is pivotally connected to the first end portion of a respective one of the locking components such that movements of the locking components from the locked position to the unlocked position are synchronized by rotation of the pivot component about the axis.

According to another aspect of the disclosure, a safety seat includes a seat unit and the child restraint spin lock mentioned above.

The seat unit includes a base member, a mid base and a seat member. The base member has two first lock sections that are spaced apart from each other. The mid base is mounted to the base member and is rotatable relative to the base member about an axis. The seat member is mounted atop the mid base and is co-rotatable with the mid base about the axis. The above-mentioned child restraint spin lock is installed in the seat unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
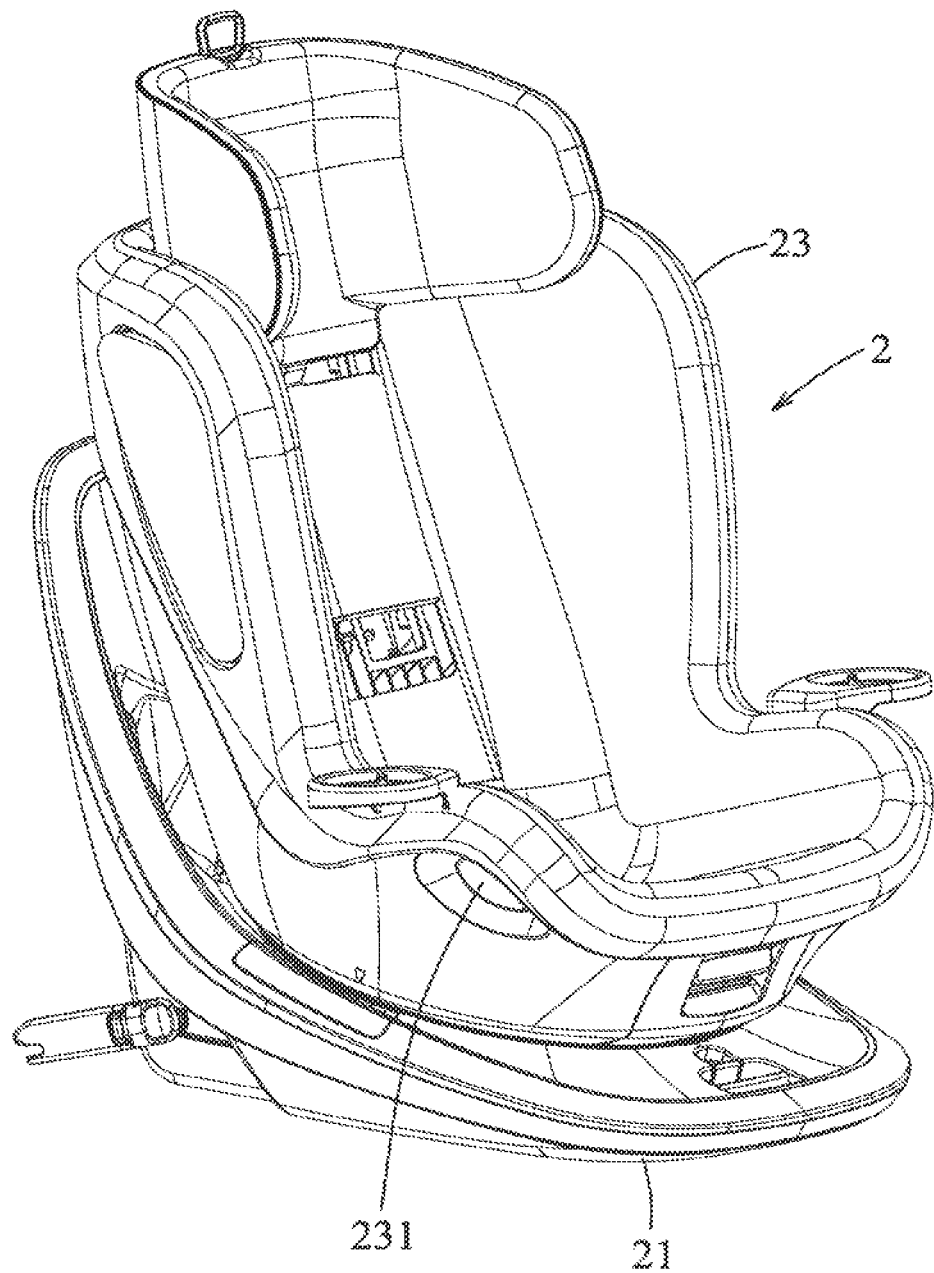
FIG. 1 is a perspective view of an embodiment of a safety seat according to the disclosure.
Figure 2:
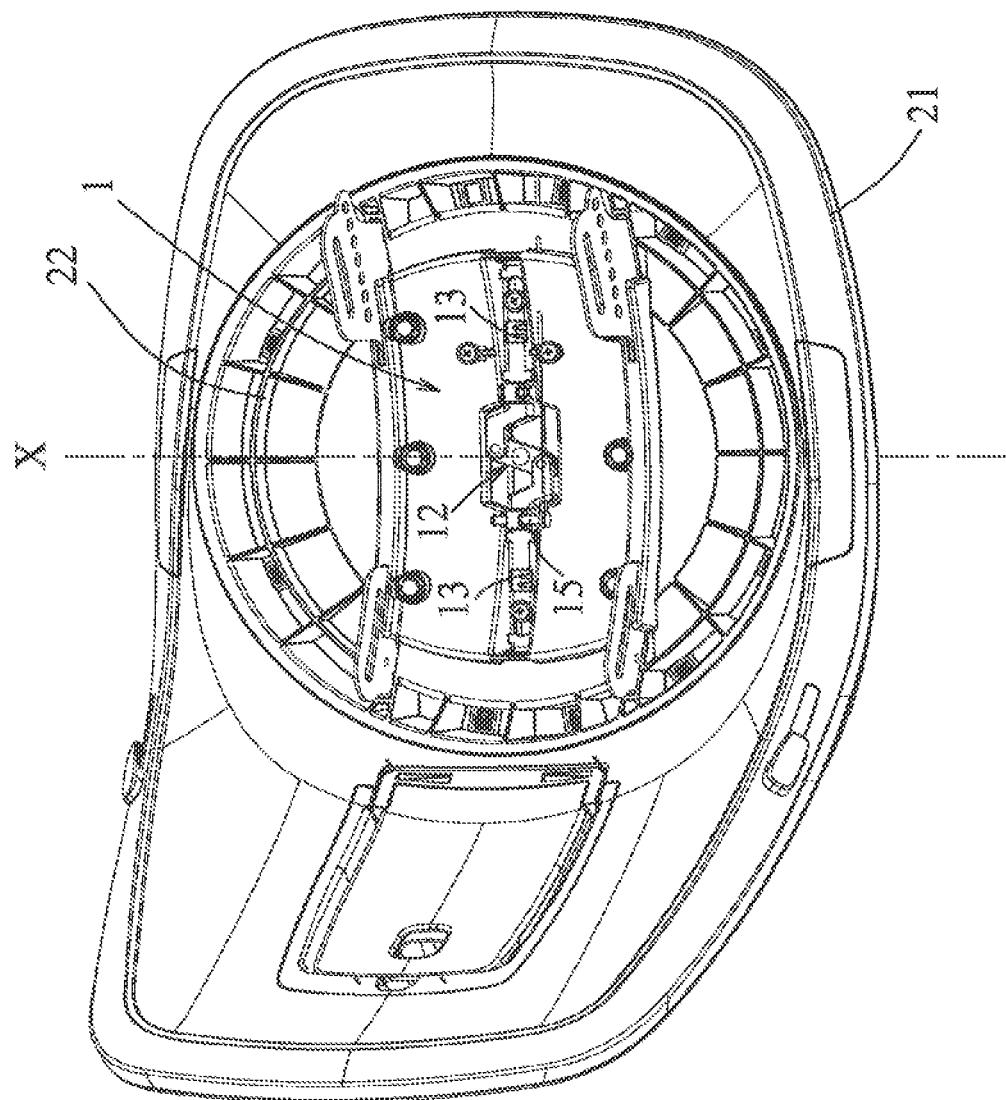
FIG. 2 is a fragmentary perspective view of a mid base and a base member of the embodiment.
Figure 3:
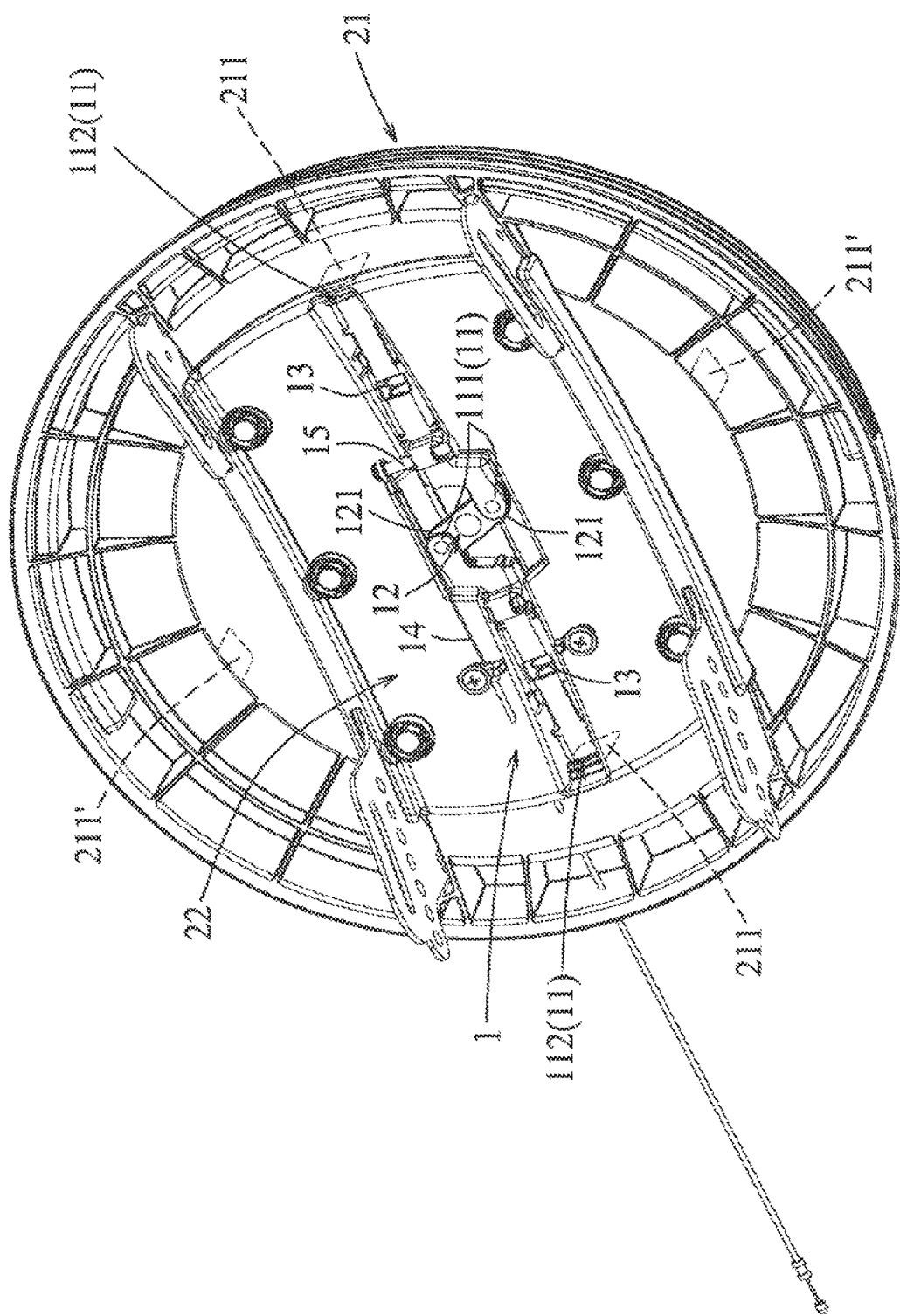
FIG. 3 is a fragmentary cutaway perspective view of the embodiment, illustrating two locking components of a child restraint spin lock at a locked position.

Referring to FIGS. 1, 2 and 3, an embodiment of a safety seat of a vehicle (not shown) includes a child restraint spin lock 1 and a seat unit 2. The seat unit 2 includes a base member 21, a mid base 22 and a seat member 23.

The mid base 22 is mounted to the base member 21, and is rotatable relative to the base member 21 about an axis (X). The base member 21 has two first lock sections 211 (see FIG. 5) that are spaced apart from each other, and two second lock sections 211' that are spaced apart from each other. In this embodiment, the first lock sections 211 are respectively disposed on opposite sides of the axis (X), the second lock sections 211' are respectively disposed on opposite sides of the axis (X), and the first and second lock sections 211, 211' are alternately arranged. That is, the first lock sections 211 (or second lock sections 211') define an angle of 180 degrees with the axis (X) serving as the vertex of the angle. In the present embodiment, the first and second lock sections 211, 211' are configured as slots.

It should be noted that, the first and second lock sections 211, 211' are not limited to the above configurations. For example, in another embodiment of the disclosure, the first or second lock sections 211, 211' may be disposed in a manner that they define an angle of 90 degrees.

The seat member 23 is mounted at op the mid base 22, is co-rotatable with the mid base 22 about the axis (X), and includes an operating component 231 that is exposed to the external environment, and that serves as a manual actuator for the child restraint spin lock 1. It should be noted that, the operating component 231 is not limited to the present configuration. For example, in other embodiments of the disclosure, the operating component 231 may be mounted to the base member 21 instead of the seat member 23.

Figure 4:
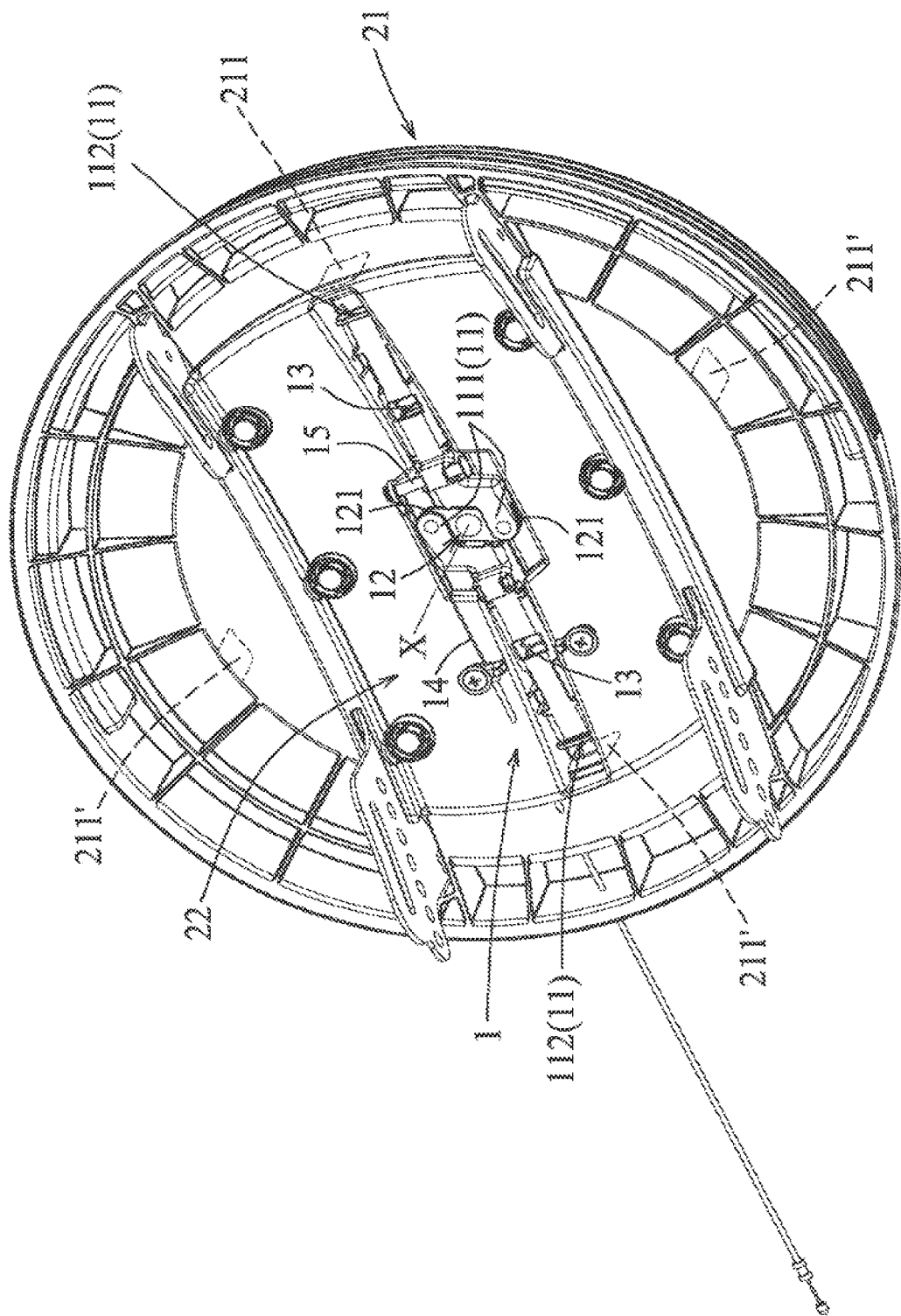
FIG. 4 is another fragmentary cutaway view of the embodiment, illustrating the locking components of the child restraint spin lock at an unlocked position.
Figure 5:
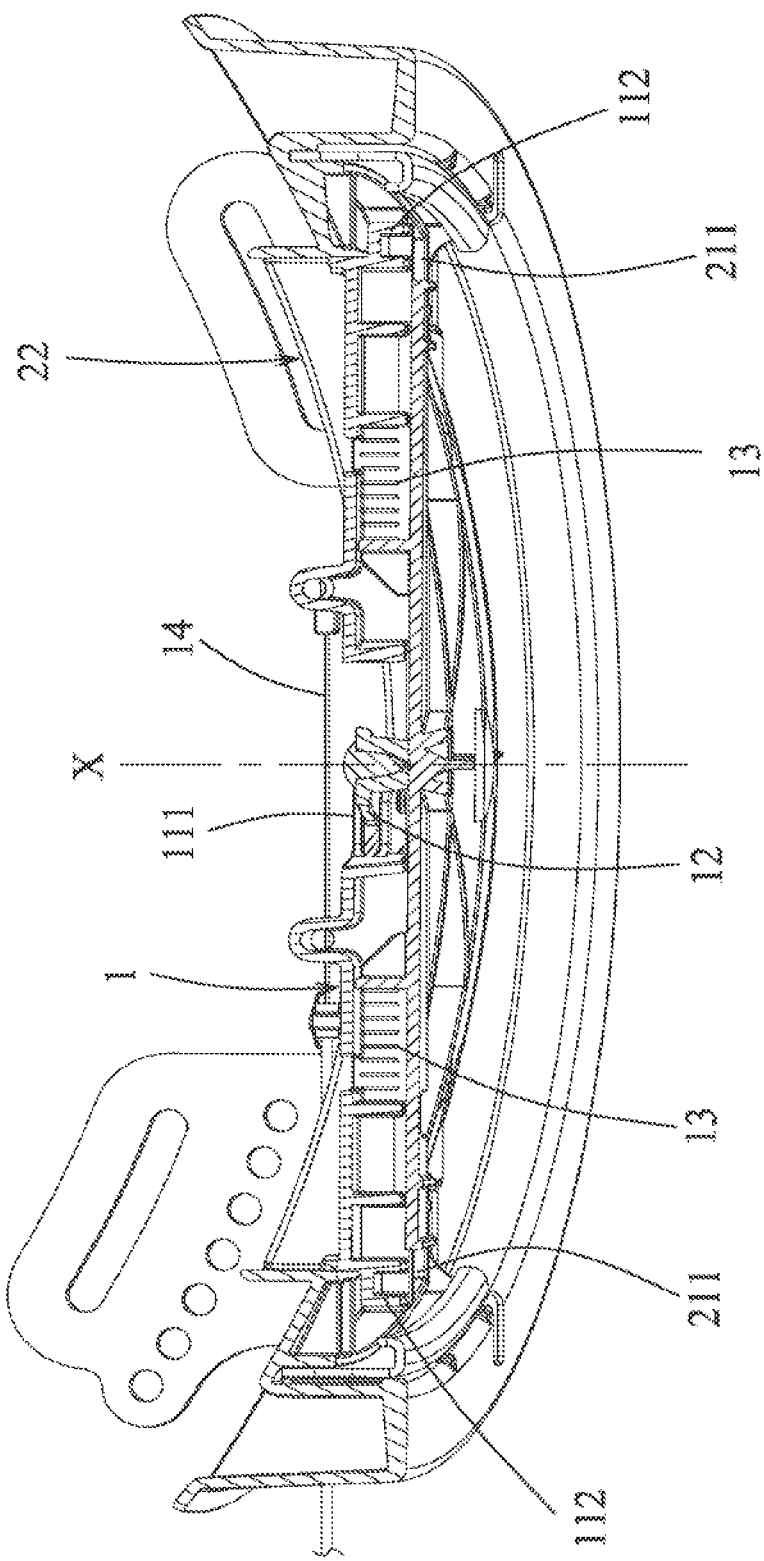
FIG. 5 is another fragmentary cutaway perspective view of the embodiment, illustrating the locking components of the child restraint spin lock at the locked position.

Referring further to FIGS. 4 and 5, the child restraint spin lock 1 is installed in the seat unit 2 between the base member 21 and the mid base 22 of the seat unit 2, and includes two locking components 11, a pivot component 12, two resilient members 13, a linking member 14 and a connecting pin 15.

The locking components 11 of the child restraint spin lock 1 are co-rotatably connected to the mid base 22, are spaced apart from each other. In this embodiment, the locking components 11 are respectively disposed on opposite sides of the axis (X).

Each of the locking components 11 has a first end portion 111 and a second end portion 112 that are respectively proximate to and distal from the axis (X), and is movable relative to the base member 21 between a locked position (see FIG. 3) and an unlocked position (see FIG. 4). It should be noted that, FIGS. 3 and 4 only show the locked and unlocked positions of the locking components 11 with respect to the first lock sections 211 of the base member 21; the locked and unlocked positions with respect to the second lock sections 211' are not shown in the figures but can be inferred therefrom.

When each of the locking components 11 is at the locked position, the second end portion 112 of each of the locking components 11 is engaged with (i.e. received in) a respective one of the first lock sections 211 of the base member 21, such that the mid base 22 is not allowed to rotate relative to the base member 21.

Conversely, when each of the locking components 11 is at the unlocked position, the second end portion 112 of each of the locking components 11 is disengaged from the respective one of the first lock sections 211 of the base member 21 so that the mid base 22 can be rotated relative to the base member 21, thereby driving rotation of the seat member 23.

It should be noted that, when the locking components 11 are engaged with the first lock sections 211 of the base member 21 as shown in FIG. 3, the seat member 23 is secured at, for example, a forward facing position (see FIG. 1). And since the first lock sections 211 are disposed on opposite sides of the axis (X) in the present embodiment, when the locking components 11 are operated to the unlocked position and the seat member 23 is rotated to a rear facing position (not shown) that is 180 degrees from the forward facing position, the locking components 11 will still be engageable with the first lock sections 211 of the base member 21 to secure the seat member 23 at the rear facing position.

Similarly, since the second lock sections 211' are disposed on opposite sides of the axis (X) in the present embodiment, when the locking components 11 are engaged with the second lock sections 211' of the base member 21, the seat member 23 is at one of two intermediate positions (not shown) which are 180 degrees different from each other.

It should also be noted that, the locking components 11 are not limited to be disposed on opposite sides of the axis (X) For example, in another embodiment of the disclosure, the locking components 11 may be perpendicular to each other and be arranged in an L-shape, and as mentioned above, the first lock sections 211 (or the second lock sections 211') may be configured in a manner that they define an angle of 90 degrees, such that they can be engaged respectively with the locking components 11 arranged in an L-shape.

The pivot component 12 is connected to the mid base 22, is rotatable relative to the mid base 22 about the axis (X), and has two end segments 121. In the present embodiment, the end segments 121 of the pivot component 12 are respectively disposed on opposite sides of the axis (X), but are not limited thereto.

Each of the end segments 121 is pivotally connected to the first end portion 111 of a respective one of the locking components 11 such that movements of the locking components 11 from the locked position to the unlocked position are synchronized by rotation of the pivot component 12 about the axis (X).

As shown in FIG. 5, each of the resilient members 13 is mounted between the mid base 22 and a respective one of the locking components 11. Specifically, each of the resilient members 13 has one end that abuts against the respective one of the locking components 11, and the other end that abuts against the mid base 22 for biasing the respective one of the locking components 11 toward the locked position.

It should be noted that, in other embodiments of the disclosure, the child restraint spin lock 1 may include only one resilient member 13 that is mounted to one of the locking components 11. Since the movements of the locking components 11 are synchronized by the pivot component 12, such configuration will provide the same functionality.

The connecting pin 15 is mounted to one of the locking components 11. The linking member 14 is connected to the one of the locking components 11 via the connecting pin 15, and is operable for driving movement of the one of the locking components 11 from the locked position to the unlocked position to result in synchronous movement of the other one of the locking components 11 via the rotation of the pivot component 12 about the axis (X). The linking member 14 is further connected to the operating component 231 of the seat member 23 such that a user may manually actuate the operation of the linking member 14 via the operating component 231.

In the present embodiment, the child restraint spin lock 1 includes only one linking member 14 that is configured as a flexible cable. However, in another embodiment of the disclosure, the child restraint spin lock 1 may include two linking members 14 that are connected to opposite ends of the connecting pin 15, and the linking members 14 may be configured as rigid links.

During operation of the child restraint spin lock 1, in the event that the seat member 23 is originally positioned in the forward facing position where the locking components 11 are engaged with the first lock sections 211 of the base member 12, a user may interact with the operating component 231 to actuate the linking member 14 to move the locking components 11.

When the locking components 11 are moved to the unlocked position with the second end portions 112 being respectively disengaged from the first lock sections 211 of the base member 21, the user is allowed to rotate the seat member 23 (and to co-rotate the mid base 22) to change orientation of the seat member 23. When the seat member 23 is rotated to one of the intermediate positions, the locking components 11 are operable to engage the second end portions 112 respectively with the second lock sections 211' for positioning the mid base 22 relative to the base member 21 (or to the rear facing position, where the locking components 11 are operable to engage the second end portions 112 respectively with the first lock sections 211 again).

It should be noted that, by virtue of the disposition of the resilient member 13, the user does not need to interact with the operating component 231 to move the locking components 11 from the unlocked position to the locked posit ion. Once the seat member 23 is rotated to any of the rear facing, forward facing and intermediate positions, the resilient member 13 will automatically push the locking components 11 to be engaged with the corresponding first or second lock sections 211, 211'. The above-mentioned process is applicable in rotating the seat member 23 from any of the rear facing, forward facing and intermediate positions to another.

It should also be noted that, in the present embodiment, a total number of the first and second lock sections 211, 211' is four. However, this number may vary in other embodiments of the disclosure to provide the user more options for positioning the seat member 23, depending on actual needs.

In sum, the present embodiment of the disclosure has advantages as follows.

By virtue of the disposition of the pivot component 12, the movements of the locking components 11 are synchronized in a straightforward fashion via two pivotal connections among the locking components 11 and the pivot component 12, without involving overly complex mechanisms. Such configuration requires less maintenance than that of the prior arts.

Also, compared with a single lock mechanism, the oppositely disposed locking components 11 are able to provide better retention, and are less susceptible to disengagement by crash forces.

Moreover, the present embodiment provides the user the options to position the seat member 23 in different orientations for different needs and circumstances.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A safety seat, comprising:
   a first base comprising a first opening and a second opening;
   a second base positioned on the first base and rotatable relative to the first base about an axis;
   a seat positioned on the second base and rotatable relative to the first base about the axis between a forward-facing position and a rear-facing position; and
   a lock disposed on the second base, the lock comprising:
   a first movable lock component configured to lock the first base with the second base, and
   a first resilient member configured to abut the first movable lock component and bias the first movable lock component to be received by the first opening or the second opening, and
   a housing in which the first resilient member is received, the housing defined by at least a wall of the first movable lock component which the first resilient member abuts,
   wherein
   the seat is in the forward-facing position when the first movable lock component is received by the first opening,
   the seat is in the rear-facing position when the first movable lock component is received by the second opening,
   the first movable lock component is movable between a locked position and an unlocked position, and
   the first resilient member and the first moveable lock component are aligned along a second axis, extending radially outward from the axis about which the second base is rotatable, in the locked position and the unlocked position of the first movable lock component, and
   the lock is rotatable with the second base.

2. The safety seat of claim 1, further comprising:
   a second movable lock component configured to lock the first base with the second base; and
   a second resilient member configured to abut the second movable lock component, the second resilient member configured to bias the second movable lock component to be received by the first opening or the second opening, wherein
   the second movable lock component is movable between a locked position and an unlocked position,
   the second resilient member is aligned along a third axis, extending radially outward from the axis about which the second base is rotatable, in the locked position and the unlocked position of the second movable lock component, and
   the second axis and the third axis are colinear.

3. The safety seat of claim 2, wherein the seat is in the forward-facing position when the second movable lock component is received by the second opening, and the seat is in the rear-facing position when the second movable lock component is received by the first opening.

4. The safety seat of claim 2, wherein the first movable lock component and the second movable lock component are configured to move synchronously.

5. The safety seat of claim 1, wherein the first resilient member comprises a first end and a second end, the first end abuts the first movable lock component and the second end is fixed relative to the second base.

6. The safety seat of claim 1, wherein the first resilient member abuts a radially inward facing wall of the first movable lock component, and the first movable lock component comprises a portion extending radially inward of the radially inward facing wall and of a distal end portion of the first resilient member.

7. The safety seat of claim 1, further comprising an actuator configured to disengage the first movable lock component from the first opening or the second opening to permit the second base to rotate relative to the first base.

8. The safety seat of claim 7, further comprising a link comprising a first distal end and a second distal end, the link extending between the first movable lock component and the actuator.

9. The safety seat of claim 8, wherein the first distal end contacts the first movable lock component and the second distal end contacts the actuator.

10. The safety seat of claim 9, wherein the actuator is configured to compress the first resilient member to an unlocked position.

11. The safety seat of claim 8, further comprising a connecting pin configured to connect the first distal end of the link to the first movable lock component.

12. The safety seat of claim 11, wherein
the connecting pin is arranged extending in a direction traversing a direction of movement of the first movable lock component, and
the second distal end of the link connects to the actuator.

13. The safety seat of claim 8, wherein the first movable lock component comprises a first portion and a second portion, and the first portion contacts the link and the second portion is receivable within the first opening or the second opening to prevent rotation of the first base relative to the second base.

14. The safety seat of claim 1, wherein the first resilient member comprises a first end and a second end distal to the first end, wherein the first end abuts the first movable lock component for biasing the first movable lock component and the second end is fixed relative to the second base.

15. The safety seat of claim 1, wherein the first movable lock component comprises a stop configured to limit radial movement of the first moveable lock component with respect to the axis and an end portion extending radially outward from the stop toward the axis.

16. The safety seat of claim 1, wherein the housing is further defined by the second base.

17. A safety seat, comprising:
a first base comprising a first opening and a second opening;
a second base positioned on the first base and rotatable relative to the first base about an axis;
a seat positioned on the second base and rotatable relative to the first base about the axis between a forward-facing position and a rear-facing position; and
a lock disposed on the second base, the lock comprising:
a first movable lock component configured to lock the first base with the second base, the first movable lock component comprising a stop configured to limit radial movement of the first moveable lock component with respect to the axis and an end portion extending radially outward from the stop away from the axis, and
a first resilient member configured to abut the first movable lock component and bias the first movable lock component towards the locked position to be received by the first opening or the second opening, and
a housing in which the first resilient member is received, the housing defined by at least a wall of the first movable lock component which the first resilient member abuts,
wherein
the first movable lock component is movable between a locked position and an unlocked position,
the seat is in the forward-facing position when the first movable lock component is received by the first opening,
the seat is in the rear-facing position when the first movable lock component is received by the second opening,
the first resilient member having an inner end and an outer end extending radially outward from the axis about which the second base is rotatable, the first resilient member is fixed with respect to the second base at the inner end of the first resilient member in the locked position and the unlocked position of the first movable lock component, and
in the locked position, the first opening or the second opening receives the end portion of the first movable lock component, and
the lock is rotatable with the second base.

18. The safety seat of claim 17, further comprising:
a second movable lock component configured to lock the first base with the second base; and
a second resilient member abutting the second movable lock component, the second resilient member configured to bias the second movable lock component to be received by the first opening or the second opening.

19. The safety seat of claim 18, wherein
the second resilient member extending radially outward from the axis about which the second base is rotatable.

20. The safety seat of claim 18, wherein the seat is in the forward-facing position when the second movable lock component is received by the second opening, and the seat is in the rear-facing position when the second movable lock component is received by the first opening.

21. The safety seat of claim 18, wherein the second resilient member comprises a third end and a fourth end, the third end abutting the second movable lock component and the fourth end fixed relative to the second base.

22. The safety seat of claim 18, wherein the first movable lock component and the second movable lock component are configured to move synchronously.

23. The safety seat of claim 18, wherein
the second movable lock component comprises a second stop configured to limit radial movement of the second moveable lock component with respect to the axis and an end portion extending radially outward from the second stop away from the axis, and
in the locked position, the first opening or the second opening receives the end portion of the second moveable lock component.

24. The safety seat of claim 17, wherein the first resilient member and the first moveable lock component are aligned along a first direction of movement extending radially outward from the axis about which the second base is rotatable.

25. The safety seat of claim 24, wherein the second resilient member is aligned along a second direction of movement extending radially outward from the axis,
the first direction of movement opposes the second direction of movement.

26. The safety seat of claim 17, wherein the first resilient member abuts a radially inward facing wall of the first movable lock component, and the first movable lock component comprises a portion extending radially inward of the radially inward facing wall and of a distal end portion of the first resilient member.

27. The safety seat of claim 17, further comprising an actuator configured to disengage the first movable lock component from the first opening or the second opening to permit the second base to rotate relative to the first base about the axis,
wherein the actuator is configured to compress the first resilient member to an unlocked position.

28. The safety seat of claim 27, further comprising:
a link comprising a first distal end and a second distal end, the link extends between the first movable lock component and the actuator; and
a connecting pin configured to connect the first distal end of the link to the first movable lock component, wherein
the link extends between the connecting pin and the actuator, and
the connecting pin is configured to move with the first movable lock component to be received by the first opening or the second opening.

29. The safety seat of claim 28, wherein the connecting pin is arranged extending in a direction traversing a direction of movement of the first movable lock component.

30. The safety seat of claim 17, wherein the housing is further defined by the second base.

31. A safety seat, comprising:
a first base comprising a first opening and a second opening;
a second base positioned on the first base and rotatable relative to the first base about an axis;
a seat positioned on the second base and rotatable relative to the first base about the axis between a forward-facing position and a rear-facing position; and
a lock disposed on the second base, the lock comprising:
a first movable lock component configured to lock the first base with the second base, and
a first resilient member configured to abut the first movable lock component and bias the first movable lock component to be received by the first opening or the second opening,
wherein
the seat is in the forward-facing position when the first movable lock component is received by the first opening,
the seat is in the rear-facing position when the first movable lock component is received by the second opening,
the first movable lock component is movable between a locked position and an unlocked position,
the first resilient member and the first moveable lock component are aligned along a second axis, extending radially outward from the axis about which the second base is rotatable, in the locked position and the unlocked position of the first movable lock component, and
portions of the first movable lock component and the second base, respectively, defining opposing walls of a chamber in which the first resilient member is received.

32. The safety seat of claim 31, wherein the first movable lock component includes a plurality of axially extending and radially spaced apart flanges supporting the first movable lock component on the second base; and
wherein the resilient member is interposed between a radially inwardly facing wall of one of the plurality of flanges and a radially outwardly facing wall of the second base.

33. The safety seat of claim 32, wherein the first movable lock component includes an opening radially aligned with the first resilient member and radially inward of the radially inwardly facing wall of the one of the plurality of flanges.

34. The safety seat of claim 32, wherein, relative to the axis about which the second base is rotatable, the first resilient member is interposed between and bounded by the first movable lock component on a first axial side and the second base on a second axial side opposite the first axial side.

35. The safety seat of claim 31, wherein the chamber at least partially encloses the at least one resilient member to retain the at least one resilient member during movement of the first movable lock component between the locked and unlocked positions.

* * * * *